United States Patent [19]

Best

[11] Patent Number: 4,626,520

[45] Date of Patent: Dec. 2, 1986

[54] POLYMERIZATION CATALYST, PRODUCTION AND USE

[75] Inventor: Steven A. Best, Houston, Tex.

[73] Assignee: Exxon Research & Engineering Co., Florham Park, N.J.

[21] Appl. No.: 821,359

[22] Filed: Jan. 22, 1986

Related U.S. Application Data

[63] Continuation of Ser. No. 638,190, Aug. 9, 1984, abandoned.

[51] Int. Cl.$^4$ ............................................. C08F 4/64
[52] U.S. Cl. .................................. 502/115; 502/117; 502/119
[58] Field of Search ..................... 502/115, 117, 119

[56] References Cited

U.S. PATENT DOCUMENTS

| | | | |
|---|---|---|---|
| 4,440,869 | 4/1984 | Shannon et al. | 502/119 X |
| 4,442,225 | 4/1984 | Takitani et al. | 502/119 X |
| 4,451,574 | 5/1984 | Johnson | 502/115 |
| 4,468,477 | 8/1984 | Caunt et al. | 502/119 X |

*Primary Examiner*—Patrick P. Garvin
*Attorney, Agent, or Firm*—M. B. Kurtzman

[57] ABSTRACT

Ethylene and alpha-olefins are homopolymerized or copolymerized with another olefin monomer in the presence of a catalyst system comprising an organo metal cocatalyst and a titanium-containing catalyst component, said titanium-containing catalyst component being obtained by reacting together a porous particulate material, an organic magnesium compound, a halogen agent other than $Cl_2$, $Br_2$ and an interhalogen compound, titanium tetrachloride and $Cl_2$, $Br_2$, an interhalogen or mixtures thereof.

16 Claims, No Drawings

POLYMERIZATION CATALYST, PRODUCTION AND USE

This is a continuation of application Ser. No. 638,190, filed 8/9/84 now abandoned.

BACKGROUND OF THE INVENTION

This invention relates to a novel solid catalyst component to be employed with a co-catalyst for use in the polymerization of olefins to polyolefins such as polyethylene, polypropylene and the like, or copolymers such as ethylene copolymers with other alpha-olefins and diolefins, which catalyst component shows unusually high activity and excellent hydrogen response for the control of polymer molecular weight. The polymer product obtained evidences an important balance of polymer properties, for example, the catalyst system obtains a polymer with a narrow molecular weight distribution, an improved balance in polymer product machine direction tear strength and in transverse direction tear strength. As a result, the blown film produced from polymer product manifests an overall higher strength.

The catalyst component comprises a solid reaction product obtained by contacting a solid, particulate, porous support material such as, for example, silica, alumina, magnesia or mixtures thereof, for example, silica-alumina, in stages with a transition metal compound, an organometallic compound of a Group IIa, IIb or IIIa metal, a halogenating agent (other than $Cl_2$, $Br$ or an interhalogen compound) and a halogen or interhalogen compound. The novel catalyst component, which when used with an aluminum alkyl cocatalyst, provides the novel catalyst system of this invention evidencing high activity which can be usefully employed for the polymerization of olefins.

The catalyst system can be employed in slurry, single-phase melt, solution and gas-phase polymerization processes and is particularly effective for the production of linear polyethylenes such as high-density polyethylene and linear low density polyethylene.

Recently, interest has arisen in the use of magnesium-titanium complex catalyst components for the polymerization of olefins. For example, European Patent Application No. 27733, published Apr. 29, 1981 discloses a catalyst component obtained by reducing a transition metal compound with an excess of organomagnesium compound in the presence of a support such as silica and thereafter deactivating the excess organomagnesium compound with certain deactivators including hydrogen chloride.

U.S. Pat. No. 4,136,058 discloses a catalyst component comprising an organomagnesium compound and a transition metal halide compound, which catalyst component is thereafter deactivated with a deactivating agent such as hydrogen chloride. This patent does not teach the use of support material such as silica but otherwise the disclosure is similar to the above-discussed European patent application.

U.S. Pat. No. 4,250,288 discloses a catalyst which is the reaction product of a transition metal compound, an organomagnesium component and an active non-metallic halide such as HCl and organic halides containing a labile halogen. The catalyst reaction product also contains some aluminum alkyls.

Catalyst components comprising the reaction product of an aluminum alkyl-magnesium alkyl complex plus titanium halide are disclosed in U.S. Pat. Nos. 4,004,071 and 4,276,191.

U.S. Pat. Nos. 4,173,547 and 4,263,171, disclose respectively a catalyst component comprising silica, an organoaluminum compound, titanium tetrachloride and dibutyl magnesium; a catalyst component comprising a magnesium alkyl-aluminum alkyl complex plus titanium halide on a silica support.

The use of chlorine gas in polymerization processes are taught in U.S. Pat. No. 4,267,292 wherein it is disclosed that chlorine gas is to be added to the polymerization reactor after polymerization has been initiated in the presence of a Ziegler catalyst. U.S. Pat. No. 4,248,735 teaches subjecting a silica support to a treatment with bromine or iodine and thereafter incorporating a chromium compound onto the support. U.S. Pat. No. 3,513,150 discloses the treatment of gamma alumina plus titanium tetrachloride with a gaseous chlorinating agent and employing said treated material in combination with a co-catalyst for the polymerization of ethylene.

European patent application No. 32,308 discloses polymerizing ethylene in the presence of a catalyst system comprising an organic metal compound and a titanium-containing material which is obtained by reacting together an inert particulate material, an organic magnesium compound, a titanium compound and a halogen containing compound such as $SiCl_4$, $PCl_3$, $BCl_3$, $Cl_2$ and the like.

Each of U.S. Pat. Nos. 4,402,861, 4,378,304, 4,388,220, 4,301,029 and 4,385,161 disclose supported catalyst systems comprising an oxide support such as silica, an organomagnesium compound, a transition metal compound and one or more catalyst component modifiers. These patents do not disclose the advantages taught in this invention.

The catalyst systems comprising magnesium alkyls and titanium compounds, although useful for the polymerization of olefins such as ethylene and other 1-olefins, do not show excellent responsiveness to hydrogen during the polymerization reaction for the control of molecular weight, do not readily incorporate comonomers such as butene-1 for the production of ethylene copolymers, and do not show an extremely high catalytic activity. Furthermore, with such catalysts one obtains polymer product whose film properties are unbalanced under anisotropic conditions.

In U.S. Pat. No. 4,451,574 issued May 29, 1984 a catalyst system obtained by treating an inert particulate support, such as silica, with an organometallic compound, a titanium halide and a halogen gas is disclosed. Although the catalyst obtains very high activities, there is a need for improving the film properties of polymer product obtained by polymerizing olefins in the presence of the catalyst and to improve the bulk density of polymer product.

In accordance with this invention catalyst combinations have been found which have extremely high catalytic activities, good comonomer incorporation and excellent hydrogen responsiveness for the control of molecular weight and obtain polymer product with greatly improved film properties. The resins exhibit excellent melt strength with a surprising decrease in power consumption (hence an increase in extrusion rates), as well as excellent MD in excess of 80 g/mil and dart impact strength in excess of 70 g/mil with a 1.0 dg/min and 0.918 density film.

The new catalyst systems and catalyst component of this invention are obtained by contacting an organometallic compound, a transition metal compound and a halide containing compound, halogen or interhalogen compound in the presence of an oxide support. The catalyst system employing the transition metal containing catalyst component is advantageously employed in a gas phase ethylene polymerization process since there is a significant decrease in reactor fouling as generally compared with prior art ethylene gas phase polymerization processes thereby resulting in less frequent reactor shut downs for cleaning.

SUMMARY OF THE INVENTION

In accordance with the objectives of this invention there is provided a transition metal containing catalyst component for the polymerization of alpha-olefins comprising a solid reaction product obtained by treating an inert solid support material in an inert solvent with (A) at least one organometallic compound of a Group IIa, IIb or IIIa metal of the Periodic Table, (B) a halogenating agent other than $Cl_2$, $Br_2$ or an interhalogen compound, (C) at least one transition metal compound of a Group IVa, Va, VIa or VIII metal of the Periodic Table, and (D) $Cl_2$, $Br_2$ or an interhalogen.

The solid transition metal-containing catalyst component when employed in combination with a co-catalyst such as an alkyl aluminum co-catalyst provides a catalyst system which demonstrates a number of unique properties that are of great importance in the olefin polymerization technology such as, for example, extremely high catalytic activity, the ability to control the molecular weight during the polymerization reaction as a result of the improved responsiveness to hydrogen, increased polymer yield, and reduced reactor fouling. The polymer product obtained from the polymerization of olefins and particularly ethylene manifests improved melt strength and tear strength.

In a preferred embodiment of the invention the (A) organometallic compound is a dihydrocarbyl magnesium compound represented by $R^1MgR^2$ wherein $R^1$ and $R^2$ which can be the same or different are selected from alkyl groups, aryl groups, cycloalkyl groups, aralkyl groups, alkadienyl groups or alkenyl groups having from 1 to 20 carbon atoms, the (B) halogenating agent is a Group IIIa metal hydrocarbyl dihalide, $SiCl_4$, $BCl_3$ or mixtures thereof, the (C) transition metal compound is preferably a transition metal compound or combination of transition metal compounds represented by the formulas $TrX'_{4-q}(OR^4)_q$, $TrX'_{4-q}R_q^5$, $VO(OR^4)_3$ and $VOX'_3$ wherein Tr is a transition metal of Groups IVb, Vb, VIb, VIIb and VIII and preferably titanium, vanadium or zirconium, $R^4$ is an alkyl group, aryl group, aralkyl group, substituted aralkyl group having from 1 to 20 carbon atoms and 1,3-cyclopentadienyls, X' is halogen and q is zero or a number less than or equal to 4, and $R^5$ is an alkyl group, aryl group or aralkyl group having from 1-20 carbon atoms or a 1,3-cyclopentadienyl and the (D) halogen is $Cl_2$.

All references to the Periodic Table are to the Periodic Table of the Elements printed on page b-3 of the 56th Edition of Handbook of Chemistry and Physics, CRC Press (1975).

The order of addition of the ingredients to the solid support material is not critical, nevertheless, it is preferred that the (B) halogenating agent and the (D) halogen compound should not be added consecutively in either order.

In a second embodiment of this invention there is provided a catalyst system comprising the transition metal containing solid catalyst component and an organoaluminum co-catalyst for the polymerization of alpha-olefins using the catalyst of this invention under conditions characteristic of Ziegler polymerization.

In view of the high activity of the catalyst system prepared in accordance with this invention as compared with conventional Ziegler catalysts, it is generally not necessary to deash polymer product since polymer product will generally contain lower amounts of catalyst residues than polymer product produced in the presence of conventional catalyst.

The catalyst systems can be employed in a gas phase process, single phase melt process, solvent process or slurry process. The catalyst system is usefully employed in the polymerization of ethylene and other alpha-olefins, particularly alpha-olefins having from 3 to 8 carbon atoms and copolymerization of these with other 1-olefins or diolefins having from 2 to 20 carbon atoms, such as propylene, butene, pentene and hexene, butadiene, 1,4-pentadiene and the like so as to form copolymers of low and medium densities. The supported catalyst system is particularly useful for the polymerization of ethylene and copolymerization of ethylene with other alpha-olefins in gas phase processes.

DESCRIPTION OF THE PREFERRED EMBODIMENTS

Briefly, the catalyst components of the present invention comprises the solid reaction product of (A) an organometallic compound, (B) a halogenating agent other than $Cl_2$, Br or an interhalogen compound, (C) at least one transition metal compound of a Group IIIa, Va, VIa and VIII metal and (D) $Cl_2$, $Br_2$ or an interhalogen compound in the presence of an inert solid support material. According to the polymerization process of this invention, ethylene, at least one alpha-olefin having 3 or more carbon atoms or ethylene and other olefins or diolefins having terminal unsaturation are contacted with the catalyst under polymerizing conditions to form a commercially useful polymeric product. Typically, the support can be any of the solid particulate porous supports such as talc, silica, zirconia, thoria, magnesia, and titania. Preferably the support material is a Group IIa, IIIa, IVa and IVb metal oxide in finely divided form.

Suitable inorganic oxide materials which are desirably employed in accordance with this invention include silica, alumina, and silica-alumina and mixtures thereof. Other inorganic oxides that may be employed either alone or in combination with the silica, alumina or silica-alumina are magnesia, titania, zirconia, and the like. Other suitable support materials, however, can be employed. For example, finely divided polyolefins such as finely divided polyethylene.

The metal oxides generally contain acidic surface hydroxyl groups which will react with the organometallic composition or transition metal compound first added to the reaction solvent. Prior to use, the inorganic oxide support is dehydrated, i.e., subject to a thermal treatment in order to remove water and reduce the concentration of the surface hydroxyl groups. The treatment is carried out in vacuum or while purging with a dry inert gas such as nitrogen at a temperature of about 100° to about 1000° C., and preferably from about 300° C. to about 800° C. Pressure considerations are not critical. The duration of the thermal treatment can be from about 1 to about 24 hours. However, shorter or longer times can be employed provided equilibrium is established with the surface hydroxyl groups.

Chemical dehydration as an alternative method of chemical dehydration of the metal oxide support material can advantageously be employed. Chemical dehydration converts all water and hydroxyl groups on the oxide surface to inert species. Useful chemical agents are, for example, $SiCl_4$, chlorosilanes, silylamines and the like. The chemical dehydration is accomplished by slurrying the inorganic particulate material, such as, for example, heptane. During the chemical dehydration reaction, the silica should be maintained in a moisture and oxygen-free atmosphere. To the silica slurry is then added a low boiling inert hydrocarbon solution of the chemical dehydrating agent, such as, for example, dichlorodimethylsilane. The solution is added slowly to the slurry. The temperature range during the chemical dehydration reaction can be from about 25° C. to about 120° C., however, higher and lower temperatures can be employed. Preferably the temperature will be from about 50° C. to about 70° C. The chemical dehydration procedure should be allowed to proceed until all the moisture is removed from the particulate support material, as indicated by cessation of gas evolution. Normally, the chemical dehydration reaction will be allowed to proceed from about 30 minutes to about 16 hours, preferably 1 to 5 hours. Upon completion of the chemical dehydration, the solid particulate material is filtered under a nitrogen atmosphere and washed one or more times with a dry, oxygen-free inert hydrocarbon solvent. The wash solvents, as well as the diluents employed to form the slurry and the solution of chemical dehydrating agent, can be any suitable inert hydrocarbon. Illustrative of such hydrocarbons are heptane, hexane, toluene, isopentane and the like.

The preferred (A) organometallic compounds employed in this invention are the hydrocarbon soluble organomagnesium compounds represented by the formula $R^1MgR^2$ wherein each of $R^1$ and $R^2$ which may be the same or different are alkyl groups, aryl groups, cycloalkyl groups, aralkyl groups, alkadienyl groups or alkenyl groups. The hydrocarbon groups $R^1$ or $R^2$ can contain between 1 and 20 carbon atoms and preferably from 1 to about 10 carbon atoms. Illustrative but non-limiting examples of magnesium compounds which may be suitably employed in accordance with the invention are dialkylmagnesiums such as diethylmagnesium, dipropylmagnesium, di-isopropylmagnesium, di-n-butylmagnesium, di-isobutylmagnesium, diamylmagnesium, dioctylmagnesium, di-n-hexylmagnesium, didecylmagnesium, and didodecylmagnesium, dicycloalkylmagnesium, such as dicyclohexylmagnesium; diaryl magnesiums such as dibenzylmagnesium, ditiolylmagnesium and dixylylmagnesium.

Preferably the organomagnesium compounds will have from 1 to 6 carbon atoms and most preferably $R^1$ and $R^2$ are different. Illustrative examples are ethylpropylmagnesium, ethyl-n-butylmagnesium, amylhexylmagnesium, n-butyl-s-butylmagnesium, and the like. Mixtures of hydrocarbyl magnesium compounds may be suitably employed such as for example dibutyl magnesium and ethyl-n-butyl magnesium.

The magnesium hydrocarbyl compounds are as generally obtained from commercial sources as mixtures of the magnesium hydrocarbon compounds with a minor amount of aluminum hydrocarbyl compound. The minor amount of aluminum hydrocarbyl is present in order to facilitate solublization of the organomagnesium compound in hydrocarbon solvent. The hydrocarbon solvent usefully employed for the organomagnesium can be any of the well known hydrocarbon liquids, for example hexane, heptane, octane, decane, dodecane, or mixtures thereof, as well as aromatic hydrocarbons such as benzene, toluene, xylenes, etc.

The organomagnesium complex with a minor amount of aluminum alkyl can be represented by the formula $(R^1MgR^2)_p(R_3^3Al)_s$ wherein $R^1$ and $R^2$ are defined as above, $R^3$ has definition and p is greater than 0. The ratio of s/s+p is from 0 to 1, preferably from 0 to about 0.7 and most desirably from about 0 to 0.1. A suitable magnesium aluminum complex is Magala ® BEM manufactured by Texas Alkyls, Inc.

Illustrative examples of the magnesium aluminum complexes are $[(n\text{-}C_4H_9)(C_2H_5)Mg][C_2H_5)_3Al]_{0.02}$, $[(nC_4H_9)_2Mg][(C_2H_5)_3Al]_{0.013}$, $[(nC_4H_9)_2Mg][(C_2H_5)_3Al]_{2.0}$ and $[(nC_6H_{13})_2Mg][(C_2H_5)_3Al]_{0.01}$.

The hydrocarbon soluble organometallic compositions are known materials and can be prepared by conventional methods. One such method involves, for example, the addition of an appropriate aluminum alkyl to a solid dialkyl magnesium in the presence of an inert hydrocarbon solvent. The organomagnesium-organoaluminum complexes are, for example, described in U.S. Pat. Nos. 3,737,393 and 4,004,071 which are incorporated herein by reference. However, any other suitable method for preparation of organometallic compounds can be suitably employed.

The transition metal compounds which can be usefully employed in the preparation of the transition metal containing catalyst component of this invention are well known in the art. The transition metals which can be employed in accordance with this invention may be represented by the formulas $TrX'_{4-q}(OR^4)_q$, $TrX'_{4-q}R_q^5$, $VOX'_3$ and $VO(OR^4)_3$. Tr is a Group IVb, Vb, VIb, VIIb, and VIII metal, preferably Group IVb and Vb metals and preferably titanium, vanadium or zirconium, q is 0 or a number equal to or less than 4, X' is halogen, $R^4$ is a hydrocarbyl or substituted hydrocarbyl group, for example, alkyl, aryl or cycloalkyl having from 1 to 20 carbon atoms and $R^5$ is an alkyl group, aryl group, aralkyl group, substituted aralkyl group, 1,3-cyclopentadienyls and the like. The aryl, aralkyls and substituted aralkyls contain from 1 to 20 carbon atoms preferably 1 to 10 carbon atoms. Mixtures of the transition metal compounds can be employed if desired.

Illustrative examples of the transition metal compounds include: $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_8H_{17})_2Br_2$, and $Ti(OC_{12}H_{25})Cl_3$.

As indicated above, mixtures of the transition metal compounds may be usefully employed with no restriction being imposed on the number of transition metal compounds which may be reacted with the organometallic composition. Any halogenide and alkoxide transition metal compound or mixtures thereof can be usefully employed. The titanium tetrahalides are especially preferred with titanium tetrachloride being most preferred.

The halogenating agents (B) which are employed in accordance with the present invention are clorinating, brominating and iodinating agents. The halogenating agents (B) suitable in accordance with this invention are different from the (D) halogen compounds. The halogenating agents can be liquid or gaseous under the reaction conditions.

Illustrative of the halogenating agents which can be employed are the hydrogen halides, for instance, hydrogen chloride, hydrogen bromide, hydrogen iodide, and the like; oxyhalides of non-metals, such as thionyl chloride, thionyl bromide, sulfuryl chloride, sulfuryl bromide, nitrosyl chloride, carbonyl chloride, phosphoryl chloride, phosphoryl bromide, and the like; halides of non-metals such as, for example, phosphorus trichloride, phosphorus pentachloride, boron trichloride, antimony pentachloride and the like; Group IIIa metal hydrocarbyl dihalides such as, for example, aluminum hydrocarbyl dichloride, aluminum hydrocarbyl dibromide, boron hydrocarbyl dibromide, boron hydrocarbyl dichloride and the like wherein the hydrocarbyl group can have from 1 to 18 carbon atoms and preferably from 1 to 8 carbon atoms and most preferably from 1 to 4 carbon atoms.

Also, the silicon halides represented by the formula $X_mSiR_n$ in which X is a halogen, R is an alkyl, cycloalkyl or aryl radical containing 1 to 20 carbon atoms; $n+m=4$ and n can be 1, 2, 3 or 4. Illustrative examples of the silicon compounds are silicon tetrachloride, silicon tetrabromide, the chlorosilanes such as, for example, trimethyl chlorosilane, dimethyl dichlorosilane, ethyl chloryltrisilane, diethyl dichlorosilane, dichlorodibutylsilane, trichlorobutylsilane, tribromobutylsilane, bromotrimethylsilane and the like. The variety of halogenating agents which can be usefully employed in accordance with this invention it is preferred to use chlorinating agents and of the chlorinating agents the Group IIIa metal hydrochloryl dihalides, silicon tetrachloride and boron trichloride or mixtures thereof are preferred.

The (D) halogens which can be suitably employed in accordance with this invention are $Cl_2$, $Br_2$, $I_2$ and mixtures thereof. Illustrative interhalogen compounds are ClF, $ClF_3$, BrF, $BrF_3$, $BrF_5$, ICl, $ICl_3$ and IBr. The preferred halogens are $Cl_2$ and $Br_2$. Most preferably $Cl_2$ is employed. The preferred interhalogens contain Cl.

In accordance with the invention, the ingredients employed in forming the transition metal-containing solid catalyst component can be added to the inert solid support material in a variety of orders. The ingredients are preferably added in separate stages. Illustrative of the orders are:
(a) D,B,A,C
(b) D,A,B,C
(c) D,A,C,B
(d) B,A,D,C
(e) A,D,B,C
(f) A,D,C,B
(g) B,A,C,D
(h) A,B,C,D
(i) A,C,B,D Preferably, the transition metal containing catalyst component is prepared by contacting the solid inert support material in separate stages sequentially with the (a) at least one organometallic compound of the Group IIa, IIb or IIIa metal, (b) the halogenating agent other than $Cl_2$, $Br_2$ or an interhalogen compound, (c) at least one transition metal compound, and (d) $Cl_2$, $Br_2$ an interhalogen or mixtures thereof.

The treatment of the support material with each of the catalyst forming ingredients as mentioned above is conducted in an inert solvent. The inert solvents can also be usefully employed to dissolve the individual ingredients prior to the treatment step. Preferred solvents include mineral oils and the various hydrocarbons which are liquid at reaction temperatures and in which the individual ingredients are soluble. Illustrative examples of useful solvents include the alkanes such as pentane, iso-pentane, hexane, heptane, octane and nonane; cycloalkanes such as cyclopentane, cyclohexane; and aromatics such as benzene, toluene, ethylbenzene and diethylbenzene. The amount of solvent employed is not critical. Nevertheless, the amount employed should be sufficient so as to provide adequate heat transfer away from the catalyst components during reaction and to permit good mixing.

The (A) organometallic component is preferably added to the inert solvent in the form of a solution. Preferred solvents for the organometallic compositions are the alkanes such as hexane, heptane, octane and the like. However, the same solvent as employed for the inert particulate support material can be employed for dissolving the organometallic composition. The concentration of the organometallic composition in the solvent is not critical and is limited only by handling needs.

The amounts of materials usefully employed in the solid catalyst component can vary over a wide range. The concentration of magnesium deposited on the essentially dry, inert support can be in the range from about 0.1 to about 2.5 millimoles/g of support, however, greater or lesser amounts can be usefully employed. Preferably, the organo magnesium compound concentration is in the range of 0.5 to 2.0 millimoles/g of support and more preferably in the range of 1.0 to 1.8 millimoles/g of support. The amount of (B) halogenating agents employed should be such as to provide a halogen to magnesium mole ratio of about 0.5 to about 3.0. The (D) halogen or interhalogen treatment is such as to provide an excess of the halogen or interhalogen. Generally, the halogen employed, such as for example $Cl_2$, is employed in the form of a gas.

The halogen treatment, for example, chlorine treatment of the catalyst can be accomplished by exposing the catalyst in either dry or slurry form to gaseous chlorine at 1.0 to 10 atmospheres total pressure for about 10 minutes to 4 hours at temperatures ranging from about 0° to 100° C. A mixture of $Cl_2$ and an inert gas such as argon or nitrogen can also be employed. The molar concentration of chlorine in the inert gas can range from one (1) mole % to 100 mole %.

The transition metal compound is added to the inert support at a concentration of about 0.01 to about 1.5 millimoles Ti/g of dried support, preferably in the range of about 0.05 to about 1.0 millimoles Ti/g of dried support and especially in the range of about 0.1 to 0.8 millimoles Ti/g of dried support.

Generally, the individual reaction steps can be conducted as temperatures in the range of about −50° C. to about 150° C. Preferred temperature ranges are from about −30° C. to about 60° C. with −10° C. to about 50° C. being most preferred. The reaction time for the individual treatment steps can range from about 5 minutes to about 24 hours. Preferably the reaction time will be from about ½ hour to about 8 hours. During the reaction constant agitation is desirable.

In the preparation of the transition metal-containing solid catalyst component, washing after the completion of any step may be effected. However, it is generally found that the material advantages of the catalyst system are diminished by washing until after all the catalyst forming ingredients have been fully reacted.

The catalyst component prepared in accordance with this invention are usefully employed with co-catalysts well known in the art of the Ziegler catalysis for polymerization of olefins. Typically, the co-catalysts which are used together with the transition metal containing catalyst component are organometallic compounds of Group Ia, IIa and IIIa metals such as aluminum alkyls, aluminum alkyl hydrides, lithium aluminum alkyls, zinc alkyls, magnesium alkyls and the like. The co-catalysts preferably used are the organoaluminum compounds. The preferred alkylaluminum compounds are represented by the formula $AlR'''_nX''_{3-n}$ wherein $R'''$ is hydrogen, hydrocarbyl or substituted hydrocarbyl group and $X''$ is a halogen. Preferably $R'''$ is an alkyl group having from 2 to 10 carbon atoms. Illustrative examples of the co-catalyst material are ethyl aluminum dichloride, ethyl aluminum sesquichloride, diethyl aluminum chloride, aluminum triethyl, aluminum tributyl, diisobutyl aluminum hydride, diethyl aluminum ethoxide and the like. Aluminum trialkyl compounds are most preferred with triisobutylaluminum and aluminum triethyl being highly desirable.

The catalyst system comprising the aluminum alkyl co-catalyst and the transition metal containing solid catalyst component is usefully employed for the polymerization of ethylene, other alpha-olefins having from 3 to 20 carbon atoms, such as for example, propylene, butene-1, pentene-1, hexene-1, 4-methylpentene-1, and the like and ethylene copolymers with other alpha-olefins or diolefins such as 1,4-pentadiene, 1,5-hexadiene, butadiene, 2-methyl-1,3-butadiene and the like. The polymerizable monomer of preference is ethylene. The catalyst system may be usefully employed to produce polyethylene or copolymers of ethylene by copolymerizing with other alpha-olefins or diolefins, particularly propylene, butene-1, pentene-1, hexene-1, and octene-1. The olefins can be polymerized in the presence of the catalysts of this invention by any suitable known process such as, for example, suspension, solution and gas-phase processes.

The polymerization reaction employing catalytic amounts of the above-described solid catalyst can be carried out under conditions well known in the art of Ziegler polymerization, for example, in an inert diluent at a temperature in the range of 50° C. to 120° C. and a pressure of 1 and 40 atmospheres, in the gas phase at a temperature range of 70° C. to 100° C. at about 1 atmosphere to 50 atmospheres and upward. Illustrative of the gas-phase processes are those disclosed in U.S. Pat. Nos. 4,302,565 and 4,302,566 which references are incorporated by reference. As indicated above, one advantageous property of the catalyst system of this invention is the reduced amount of gas phase reactor fouling. The catalyst system can also be used to polymerize olefins at single phase conditions, i.e., 150° C. to 320° C. and 1,000-3,000 atmospheres. At these conditions the catalyst lifetime is short but the activity sufficiently high that removal of catalyst residues from the polymer is unnecessary. However, it is preferred that the polymerization be done at pressures ranging from 1 to 50 atmospheres, preferably 5 to 25 atmospheres.

In the processes according to this invention it has been discovered that the catalyst system is highly responsive to hydrogen for the control of molecular weight. Other well known molecular weight controlling agents and modifying agents, however, may be usefully employed.

The polyolefins prepared in accordance with this invention can be extruded, mechanically melted, cast or molded as desired. They can be used for plates, sheets, films and a variety of other objects.

While the invention is described in connection with the specific examples below, it is understood that these are only for illustrative purposes. Many alternatives, modifications and variations will be apparent to those skilled in the art in light of the below examples and such alternatives, modifications and variations fall within the general scope of the claims.

In the Examples following the silica support was prepared by placing Davison Chemical Company G-952 silica gel in a vertical column and fluidizing with an upward flow of $N_2$. The column was heated slowly to 600° C. and held at that temperture for 12 hours after which the silica was cooled to ambient temperature.

The melt index (MI) and melt index ratio (MRI) were measured in accordance with ASTM test D1238. The resin density was determined by density gradient column according to ASTM test D1505.

EXAMPLES 1-7

Catalyst Synthesis:

Catalysts prepared using the formulation silica+-chlorinating agent+magnesium alkyl +$TiCl_4$ with halogen (D) treatment varied with respect to the order of addition of the ingredients.

A 3.5 g portion of silica gel was placed into a 125 cc septum vial equipped with a stirring bar. 75 ml of dried, degassed hexane with added via a syringe and the suspension stirred. 15.7 mmol chlorinating agent (as listed in Table 1) diluted to 1 mmole/cc in hexane was added to the suspension and stirring was continued for 1 hour at room temperature. The solids were removed from the solvent by decantation and the solvent replaced with fresh hexane. To the suspension was added 9.2 ml (6.35 mmol) of a hexane solution of butylethylmagnesium. The addition was added dropwise at ambient temperatures and with constant stirring. The stirring was continued for 1 hour. To the suspension was added 2.1 ml portion of a hexane solution of $TiCl_4$ containing 1.0 mmol $TiCl_4$ per ml. The $TiCl_4$ solution was added slowly and with constant stirring at room temperature. The stirring was continued for 1 hour.

The catalyst was reacted at different stages as shown in Table 1 with chlorine gas by pressurizing the vial to 7.5 psig with dry chlorine gas and constantly maintaining the dry chlorine gas stream for 1 hour. Upon completion of chlorination the vial was flushed with nitrogen for 15 minutes. Subsequent steps if the (D) chlorination step was not the last step or carried out as shown above the finally prepared catalyst would permit it to settle and the solids were separated from the solvent by decantation. The catalyst was washed 3 times with dry hexane and dried.

Polymerization

To a 1.8 liter reactor there was added 800 cc of hexane, 0.075 g of the titanium containing solid catalyst component, triisobutyl aluminum cocatalyst in an amount so as to provide an aluminum to titanium ratio of 50 mmoles. The vessel was pressured to 30 psig with $H_2$, 45 cc of 1-butene was added and the vessel was thereafter pressured to 150 psig with ethylene. The vessel was heated to 85° C. and polymerization was maintained for 40 minutes. Results of the polymerization are summarized in Table 1.

EXAMPLES 8-17

Catalyst Synthesis:

Catalyst prepared using the formulation silica+BEM+chlorinating agent+TiCl$_4$.

The ratio of ingredients and conditions for the preparation of the catalysts for each of the catalysts are identical to that in Examples 1-7 with the exception that the order of addition to the silica was changed as indicated above. As in Examples 1-7 the chlorine addition for each example was varied. The chlorination and halogenating agent employed are summarized in Table 2.

Polymerization.

Ethylene was polymerized in the manner as described under Examples 1-7. Results are summarized in Table 2.

EXAMPLES 18-25

Catalyst Synthesis:

Catalyst prepared using the formulation silica+BEM+TiCl$_4$+chlorinating agent.

The ratio of ingredients and conditions for the preparation of the catalysts for each of the catalysts are identical to that in Examples 1-7 with the exception that the order of addition to the silica was changed as indicated above. As in Examples 1-7 the chlorine addition for each example was varied. The chlorination and halogenating agent employed are summarized in Table 3.

Polymerization

Ethylene was polymerized in the manner as described under Examples 1-7. Results are summarized in Table 2.

TABLE 1

| Catalyst Formulation | Specific Activity | MI | MIR | Density |
|---|---|---|---|---|
| SiO$_2$/Cl$_2$/SiCl$_4$/BEM/TiCl$_4$ | 7.0 | 15.7 | 26.3 | 0.9437 |
| SiO$_2$/Cl$_2$/EADC/BEM/TiCl$_4$ | 97.5 | 10.5 | 29.10 | 0.9397 |
| SiO$_2$/Cl$_2$/BCl$_3$/BEM/TiCl$_4$ | 154.5 | 25.3 | 27.1 | 0.9348 |
| SiO$_2$/EADC/BEM/Cl$_2$/TiCl$_4$ | 97.5 | 4.92 | 26.1 | 0.9425 |
| SiO$_2$/SiCl$_4$/BEM/TiCl$_4$/Cl$_2$ | 19.0 | 2.43 | 31.6 | 0.9400 |
| SiO$_2$/EADC/BEM/TiCl$_4$/Cl$_2$ | 93.8 | 2.28 | 30.3 | 0.9394 |
| SiO$_2$/BCl$_3$/BEM/TiCl$_4$/Cl$_2$ | 98.0 | 2.70 | 29.3 | 0.9388 |

TABLE 2

| Catalyst Formulation | Specific Activity | MI | MIR | Density |
|---|---|---|---|---|
| SiO$_2$/Cl$_2$/BEM/SiCl$_4$/TiCl$_4$ | 10.9 | 14.1 | 25.3 | 0.9409 |
| SiO$_2$/Cl$_2$/BEM/EADC/TiCl$_4$ | 103.1 | 4.4 | 24.6 | 0.9368 |
| SiO$_2$/Cl$_2$/BEM/BCl$_3$/TiCl$_4$ | 75.1 | 9.6 | 23.8 | 0.9394 |
| SiO$_2$/BEM/Cl$_2$/SiCl$_4$/TiCl$_4$ | 23.6 | 13.7 | 26.7 | 0.9444 |
| SiO$_2$/BEM/Cl$_2$/EADC/TiCl$_4$ | 104.8 | 9.3 | 22.1 | 0.9419 |
| SiO$_2$/BEM/Cl$_2$/BCl$_3$//TiCl$_4$ | 56.8 | 12.3 | 23.9 | 0.9401 |
| SiO$_2$/BEM/SiCl$_4$/TiCl$_4$/Cl$_2$ | 23.2 | 1.30 | 39.5 | 0.9396 |
| SiO$_2$/BEM/EADC/TiCl$_4$/Cl$_2$ | 102.1 | 1.55 | 32.8 | 0.9388 |
| SiO$_2$/BEM/BCl$_3$/TiCl$_4$/Cl$_2$ | 113.2 | 2.20 | 27.7 | 0.9398 |
| SiO$_2$/BEM/Cl$_2$/TiCl$_4$/BCl$_3$ | 15.9 | 4.80 | 30.0 | 0.9429 |

TABLE 3

| Catalyst Formulation | Specific Activity | MI | MIR | Density |
|---|---|---|---|---|
| SiO$_2$/Cl$_2$/BEM/TiCl$_4$/SiCl$_4$ | 15.0 | 8.2 | 23.9 | 0.9425 |
| SiO$_2$/Cl$_2$/BEM/TiCl$_4$/EADC | 26.6 | 14.5 | 25.7 | 0.9425 |
| SiO$_2$/Cl$_2$/BEM/TiCl$_4$/BCl$_3$ | 48.6 | 34.8 | 21.5 | 0.9389 |
| SiO$_2$/BEM/Cl$_2$/TiCl$_4$/SiCl$_4$ | 15.6 | 10.15 | 25.1 | 0.9446 |
| SiO$_2$/BEM/Cl$_2$/TiCl$_4$/EADC | 113.2 | 25.1 | 21.9 | 0.9397 |
| SiO$_2$/BEM/Cl$_2$/TiCl$_4$/BCl$_3$ | 32.7 | 22.7 | 21.3 | 0.9405 |
| SiO$_2$/BEM/TiCl$_4$/EADC/Cl$_2$ | 24.2 | 2.40 | 27.2 | 0.9370 |
| SiO$_2$/BEM/TiCl$_4$/BCl$_3$/Cl$_2$ | 39.8 | 2.30 | 32.2 | 0.9401 |

What is claimed is:

1. A transition metal containing catalyst component comprising the solid reaction product obtained by sequentially treating an inert solid support material in an inert solvent with (A) an organometallic compound represented by the formula R$^1$MgR$^2$ wherein R$^1$ and R$^2$, which can be the same or different, are selected from alkyl groups, aryl groups, cycloalkyl groups, aralkyl groups, alkadienyl groups, or alkenyl groups having from 1-10 carbon atoms, (B) BCl$_3$ or ethyl aluminum dichloride, (C) a halogenide or alkoxide titanium compound, and (D) Cl$_2$, Br$_2$, an interhalogen or mixtures thereof wherein the treating is performed in an order selected from the orders (a) D, B, A, C, (b) D, A, B, C, (c) D, A, C, B, (d) A, D, B, C, and (e) A, D, C, B.

2. The transition metal containing catalyst of claim 1 wherein the halogen is Cl$_2$ gas.

3. The transition metal containing catalyst component of claim 1 wherein the inert solid support material is one of silica, alumina, magnesia or mixtures thereof.

4. The transition metal containing catalyst component of claim 1 wherein R$^1$ and R$^2$ are different.

5. The transition metal containing catalyst component of claim 4 wherein the magnesium compound is butylethyl magnesium.

6. The transition metal containing catalyst component of claim 1 wherein the transition metal compound is TiCl$_4$.

7. The transition metal containing catalyst component of claim 1 wherein the solid support material is initially contacted with the (D) halogen or interhalogen compound.

8. The transition metal containing catalyst component of calim 1 wherein the contacting with the (D) halogen or interhalogen is subsequent to the contacting with the (A) organometallic compound.

9. A catalyst system for the polymerization of ethylene or copolymerization of ethylene and alpha-olefins having from 3 to 12 carbon atoms comprising (a) an organo aluminum compound of the formula AlR''$_n$X''$_{3-n}$ wherein R'' is hydrogen, hydrocarbon or substituted hydrocarbon having from 1 to 20 carbon atoms, X is halogen and n is a number from 1 to 3, and (b) a transition metal containing catalyst component comprising the solid reaction product obtained by treating an inert solid support material in an inert solvent with (A) an organometallic compound represented by the formula R$^1$MgR$^2$ wherein R$^1$ and R$^2$, which can be the same or different, are selected from alkyl groups, aryl groups, cycloalkyl groups, aralkyl groups, alkadienyl groups, or alkenyl groups having from 1-10 carbon atoms, (B) BCl$_3$ or ethyl aluminum dichloride, (C) a halogenide or alkoxide titanium compound, and (D) Cl$_2$, Br$_2$, an interhalogen or mixtures thereof wherein the treating is performed in an order selected from the orders (a) D, B, A, C, (b) D, A, B C, (c) D, A, C, B, (d) A, D, B, C, and (e) A, D, C, B.

10. The catalyst system of claim 9 wherein the halogen is Cl$_2$.

11. The catalyst system of claim 9 wherein the inert solid support material is one of silica, alumina, magnesia or mixtures thereof.

12. The catalyst system of claim 9 wherein $R^1$ and $R^2$ are different.

13. The catalyst system of claim 9 wherein the magnesium compound is butylethyl magnesium.

14. The catalyst system of claim 9 wherein the transition metal compound is $TiCl_4$.

15. The catalyst system of claim 9 wherein the solid support material is initially contacted with the (D) halogen or interhalogen compound.

16. The catalyst system of claim 9 wherein the contacting with the (D) halogen or interhalogen is subsequent to the contacting with the (A) organometallic compound.

* * * * *